United States Patent Office 3,641,064
Patented Feb. 8, 1972

3,641,064
POLYGLYCIDYL ESTERS
Alfred Heer, Birsfelden, and Karl Metzger, Aesch, Basel-Land, Switzerland, assignors to Ciba Limited, Basel, Switzerland
No Drawing. Filed Jan. 21, 1969, Ser. No. 792,748
Claims priority, application Switzerland, Jan. 29, 1968, 1,311/68
Int. Cl. C07d 1/18
U.S. Cl. 260—348 A                      7 Claims

ABSTRACT OF THE DISCLOSURE

New polyglycidyl esters of formula

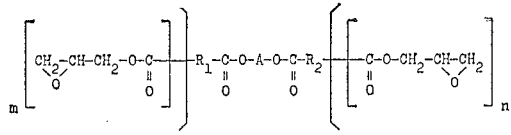

wherein $R_1$ and $R_2$ independently of each other denotes a residue, obtained by removing the carboxyl groups, of an aromatic polycarboxylic acid having 2 to 6 carboxyl groups, A represents the residue, obtained by removing the two hydroxyl groups, of a polyalkylene glycol or average molecular weight of at least 200 and wherein $m$ and $n$ denote integers having a value of at least 1 and at most 3, preferably 1 or 2.

---

The subject of the present invention is new long-chain polyglycidyl esters containing aromatic acid residues, of general formula

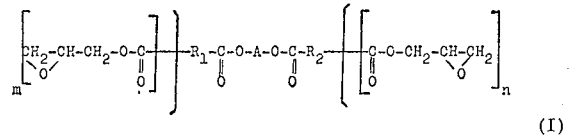

(I)

wherein $R_1$ and $R_2$ independently of each other denotes a residue, obtained by removing the carboxyl groups, of an aromatic polycarboxylic acid having 2 to 4 carboxyl groups, A represents the residue, obtained by removing the two hydroxyl groups, of a polyalkylene glycol of average molecular weight of at least 200, and wherein $m$ and $n$ denote integers having a value of at least 1 and at most 3, preferably 1 or 2.

Amongst the polyglycidyl esters according to the invention, of Formula I, the symmetrical compounds in which $R_1=R_2$ and $m=n$ can be most easily manufactured. Furthermore such polyglycidyl esters in which $R_1$ and $R_2$ denote the residue of a mononuclear aromatic polycarboxylic acid having 2 or 3 carboxyl groups and in which the residue A is derived from a polyalkylene glycol which is built up of alkylene glycol units having 2 to 6 carbon atoms are, in addition to being distinguished by easy accessibility, also distinguished by particularly valuable technical properties.

Specially preferred compounds are the symmetrical diglycidyl esters of formula

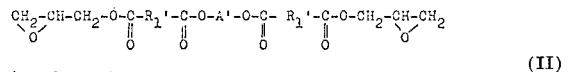

(II)

wherein $R_1'$ denotes an unsubstituted phenylene residue or a phenylene residue substituted by halogen and $A'$ denotes the residue, obtained by removing the two hydroxyl groups, of a polyalkylene glycol of formula

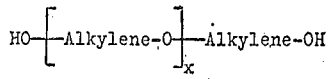

(III)

wherein "Alkylene" is an alkylene residue having 2 to 6 carbon atoms and the number $x$ is so chosen that the average molecular weight of the polyalkylene glycol is at least 200, preferably about 250 to about 2500.

The polyglycidyl esters according to the invention are as a rule liquid at room temperature. The compounds derived from polyalkylene glycols with higher glycol structural units, such as for example polyhexanediol, are mostly solid and crystalline.

The new polyglycidyl esters of Formula I can be manufactured by reacting a partial ester of formula

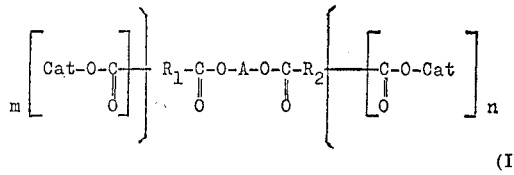

(IV)

wherein $R_1$, $R_2$, A, $m$ and $n$ have the same significance as in Formula I and "Cat" denotes a cation, preferably hydrogen or alkali metal, in a single stage or several stages with an epihalogenohydrin or β-methylepihalogenohydrin with elimination of "Cat-Hall," wherein "Hall" denotes the halogen atom of the epihalogenohydrin or β-methylepihalogenohydrin, in a manner which is in itself known.

For example, it is possible to proceed by reacting alkali salts of the partial esters, such as for example the disodium salt of the half-ester from 1 mol of a polypropylene glycol of molecular weight 425 and 2 mols of phthalic anhydride at elevated temperature with an excess of the epihalogenohydrin or β-methylepihalogenohydrin such as epichlorhydrin or β-methylchlorhydrin, filtering off the inorganic salt which has separated out and distilling off the excess epichlorhydrin.

It is furthermore possible to react the partial ester in the form of the free acid with an excess of the epihalogenohydrin, that is to say as a rule in an amount of more than 2 mols per free carboxyl group, in the presence of suitable catalysts such as for example tertiary amines, quaternary ammonium salts or ion exchanger resins, in a single stage to give the glycidyl ester. In this reaction the corresponding halogenohydrin ester is first formed with the epihalogenohydrin adding to the free carboxyl groups of the half-ester. The excess epihalogenohydrin then eliminates hydrogen halide from the halogenohydrin ester groups, with the formation of glycidyl ester groups and of an equivalent quantity of glycerine dihalogenohydrin. The latter is distilled off together with the epihalogenohydrin after completion of the reaction and can be regenerated to epihalogenohydrin by treatment with strong alkalis. Such a single-stage catalytic process is for example described in German patent specification 1,165,030. The process suffers from the disadvantage of yielding relatively impure products which, as a result of major contents of halogenohydrin esters, have a relatively low epoxide oxygen content and a high halogen or chlorine content.

The new glycidyl esters according to the invention, of Formula I, are preferably manufactured by reacting an epihalogenohydrin, preferably epichlorhydrin, in the presence of a catalyst such as preferably a tertiary amine or a quaternary ammonium base or a quaternary ammonium salt, with a partial ester of Formula IV and treating the resulting product containing halogenohydrin groups with reagents which eliminate hydrogen halide.

Suitable catalysts for the addition of epichlorhydrin are above all tertiary amines such as triethylamine, tri-n-propylamine, benzyldimethylamine, N.N′-dimethylaniline and triethanolamine; quarternary ammonium bases such as benzyltrimethylammonium hydroxide; quaternary ammonium salts such as tetramethylammonium chloride, tetraethylammonium chloride, benzyltrimethylammonium chloride, benzyltrimethylammonium acetate and methyltriethylammonium chloride; and furthermore ion exchanger resins having tertiary or quaternary amino groups, and also trialkylhydrazonium salts such as trimethylhydrazonium iodide.

Further suitable catalysts are also low molecular thioethers and sulphonium salts, or compounds which can change into thioethers or sulphonium compounds with the epihalogenohydrins, such as hydrogen sulphide, sodium sulphide or mercaptants. As such thioethers or sulphonium salts there may be mentioned: diethyl sulphide, β-hydroxyethyl ethyl sulphide, β-hydroxypropyl ethyl sulphide, ω-hydroxytetramethylene ethyl sulphide, thiodiglycol, mono-β-cyanoethyl thioglycol ether, dibenzyl sulphide, benzyl ethyl sulphide, benzyl butyl sulphide, trimethylsulphonium iodide, tris(β-hydroxyethyl)-sulphonium chloride, dibenzylmethylsulphonium bromide, 2,3-epoxypropylmethylethylsulphonium iodide, dodecyl methyl sulphide and dithiane.

Strong alkalis such as anhydrous sodium hydroxide or aqueous sodium hydroxide solution are as a rule used for the dehydrohalogenation, but it is also possible to employ other strong alkaline reagents such as potassium hydroxide, barium hydroxide, calcium hydroxide, sodium carbonate or potassium carbonate.

The dehydrohalogenation can in turn be carried out in several stages. Thus it is possible first to treat at elevated temperature with solid sodium or potassium hydroxide and, after distilling off the excess epihalogenohydrin, to heat in an inert solvent with an excess of concentrated alkali hydroxide solution, for example 50% strength sodium hydroxide solution, as is described in German published specification 1,211,177.

Possible epihalogenohydrins are epibromhydrin and above all epichlorhydrin. Good yields are obtained if an excess of epichlorhydrin and in particular preferably 5 to 40 mols of epichlorhydrin are used per carboxyl group. During the first reaction, before the addition of alkali, a partial epoxidation of the dichlorhydrin ester of the partial ester (IV) already takes place. The epichlorhydrin, which acts as a hydrogen chloride acceptor is at the same time partially converted to glycerine dichlorhydrin and this is again regenerated to give epichlorhydrin on adding alkali.

Using this preferred process variant last described excellent results can in particular also be obtained in the glycidylation according to the invention of the condensation products from 2 mols of an aromatic polycarboxylic acid anhydride and 1 mol of a long-chain polyalkylene glycol. The procedure developed for this new group of glycidyl esters which confer flexibility is also economically interesting since it is possible to work with very concentrated materials (solutions of 38–50% of glycidyl compound is epichlorhydrin) and since the yields are in general very good, that is to say between 93% and 99% of theory. The epoxide content of the technical products is then as a rule between 92 and 97% of theory and the chlorine content between 0.2 and 1.5%.

Processes for the manufacture of the polyglycidyl esters of partial esters from 1 mol of a lower molecular polyalcohol or glycol (molecular weight at most about 150) such as ethylene glycol, diethylene glycol or triethylene glycol, and $n$ or 2 mols of a dicarboxylic acid anhydride such as phthalic anhydride have already been described in the patent literature (compare British patent specification 884,033 and German published specifications 1,165,030 and 1,168,907). The partial esters can either be separately manufactured in one stage and then converted to the polyglycidyl ester by means of epichlorhydrin (compare German published specification 1,165,030), or are produced on glycidylation in situ, by reacting a mixture of epichlorhydrin, dicarboxylic acid anhydride and polyalcohol or polyglycol. These known processes use ion exchangers as addition catalysts, and a very large excess of epichlorhydrin (the solutions contain only 3.5 to 6.5% by weight of ester-carboxylic acid in the epichlorhydrin); for this reason these processes are economically of less interest because of the epichlorhydrin losses which can never be avoided. The technical crude products obtained according to the known processes show high chlorine contents (3–10%) so that they cannot be considered for many technical applications because of the corrosion properties.

The partial esters of Formula II used as starting compounds can for example be manufactured according to known processes by reacting 2 mols of a polycarboxylic acid anhydride of formula

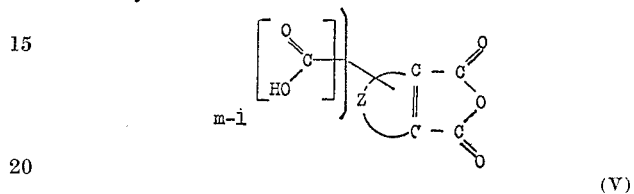

where Z denotes a bivalent residue which is necessary to complete an aromatic ring or ring system, with the aromatic ring or the ring system being allowed optionally to carry further substituents such as alkyl groups or halogen atoms, with 1 mol of a polyalkylene glycol of formula

wherein the symbols A and $m$ have the same significance as in Formula I and wherein the polyalkylene glycol (VI) has an average molecular weight of at least 200, preferably 250–2500.

As anhydrides of Formula V there may be mentioned: phthalic anhydride, tetrachlorophthalic anhydride, trimellitic acid anhydride, and pyromellitic acid monoanhydride.

Possible polyalkylene glycols of Formula VI are above all the polyethylene glycols, polypropylene glycols, polybutylene glycols and polyhexanediols having an average molecular weight of at least 200 and preferably molecular weights of about 250 to about 2500.

The new polyglycidyl esters according to the invention, of Formula I, react with the usual curing agents for epoxide compounds and can therefore be cross-linked or fully cured by adding such curing agents, in a manner analogous to that used in the case of polyfunctional epoxide compounds or epoxide resins. Possible hardeners of this kind are basic or acid compounds.

The curing properties of the polyglycidyl esters (I) can vary as a function of the acid strength of the aromatic polycarboxylic acid incorporated. Derivatives of strong dicarboxylic acids ($p_K$-value less than 4) as a rule already cure completely in the cold with amine curing agents, whilst derivatives of weaker polycarboxylic acids can as a rule only be cured with warming.

As suitable curing agents there may for example be mentioned: amines or amides such as aliphatic, cycloaliphatic or aromatic, primary, secondary or tertiary amines, for example monoethanolamine, ethylene diamine, hexamethylene diamine, trimethylhexamethylene diamine, diethylene triamine, triethylene tetramine, tetraethylene pentamine, N,N'-dimethylpropylenediamine-1,3, N,N'-diethylpropylenediamine-1,3, 2,2 - bis(4'-aminocyclohexyl)-propane, 3,5,5-trimethyl - 3 - (aminomethyl)-cyclohexylamine ("isophorone diamine"), Mannich bases such as 2,4,6 - tris(dimethylaminomethyl)phenol; m-phenylene diamine, p-phenylene diamine, bis(4-aminophenyl)methane, bis(4-aminophenyl)sulphone, n-xylene diamine; adducts of acrylonitrile or monoepoxides such as ethylene oxide or propylene oxide, to polyalkylene polyamines such as diethylene triamine or triethylene tetramine; adducts from polyamines such as diethylene triamine or triethylene tetramine in excess and polyepoxides such as bisphenol-A polyglycidyl ethers, ketimines, for example from acetone or methyl ethyl ketone, and bis(p-aminophenyl)methane; adducts of monophenols or polyphenols and polyamines; polyamides, especially those from aliphatic polyamines, such as diethylene triamine or triethylene tetramine, and dimerised or trimerised unsaturated fatty acids such as dimerised linseed oil fatty acid ("Versamid"); polymeric polysulphides ("Thiokol"); dicyandiamide, aniline-formaldehyde resins; polyhydric phenols, for example resorcinol, 2,2-bis(4'-hydroxyphenyl) propane or phenol-formaldehyde resins; boron trifluoride and its complexes with organic compounds such as $BF_3$-ether complexes and $BF_3$-amine complexes, for example $BF_3$-monoethylamine complex; acetoacetanilide-$BF_3$ complex; phosphoric acid; triphenyl phosphite; polybasic carboxylic acids and their anhydrides, for example phthalic anhydride, $\Delta^4$-tetrahydrophthalic anhydride, hexahydrophthalic anhydride, 4-methyl-hexahydrophthalic anhydride, 3,6-endomethylene-$\Delta^4$-tetrahydrophthalic anhydride, methyl-3,6-endomethylene-$\Delta^4$-tetrahydrophthalic anhydride (=methylnadic anhydride), 3,4,5,6,7,7 - hexachloro-3,6-endomethylene-$\Delta^4$-tetrahydrophthalic anhydride, succinic anhydride, adipic anhydride, azelaic anhydride, sebacic anhydride, maleic anhydride, dodecenylsuccinic anhydride; pyromellitic acid dianhydride or mixtures of such anhydrides.

Curing accelerators can furthermore be employed in the cure, and in particular when using polyamides, polymeric polysulphides or polycarboxylic acid anhydrides as curing agents; such accelerators are for example: tertiary amines, their salts or quaternary ammonium compounds, for example 2,4,6-tris(dimethylaminomethyl)phenol, benzyldimethylamine, 2-ethyl-4-methyl-imidazole, and triamylammonium phenolate; or alkali metal alcoholates such as for example sodium hexanetriolate.

The expression "cure" as used here denotes the conversion of the above diepoxides into insoluble and infusible crosslinked products, and in fact as a rule with simultaneous shaping to give shaped articles such as castings, pressings or laminates or to give two-dimensional structures such as coatings, lacquer films or adhesive bonds.

Depending on the selection of the components from which the polyglycidyl ester (I) is formed and on the type of curing agent, strongly flexible or slightly flexible or even rubber-elastic articles are obtained. The shaped articles as a rule show a low water absorption, good notch strength, high tensile strength and high elongation at break. The technical products of low chlorine content of about 0.5% are furthermore distinguished by particularly favourable corrosion behaviour (for example when used for embedding or cementing of metallic conductors).

If desired, active diluents such as for example styrene oxide, butyl glycidyl ether, iso-octyl glycidyl ether, phenyl glycidyl ether, cresyl glycidyl ether, glycidyl esters of synthetic highly branched mainly tertiary aliphatic monocarboxylic acids ("Cardura E") or cycloaliphatic monoepoxides such as 3-vinyl-2,4-dioxa-spiro(5,5)-9,10-epoxy-undecane can be added to the diepoxides according to the invention in order to lower the viscosity.

The diepoxides according to the invention can furthermore be used as mixtures with other curable diepoxide or polyepoxide compounds. As such there may for example be mentioned: polyglycidyl ethers of polyhydric alcohols, such as 1,4-butanediol, polyethylene glycols, polypropylene glycols or 2,2-bis(4'-hydroxycyclohexyl)propane: polyglycidyl ethers of polyhydric phenols, such as 2,2-bis(4'-hydroxyphenyl)propane (=bisphenol A), 2,2-bis(4'-hydroxy - 3',5' - dibromophenyl)propane, bis(4-hydroxyphenyl)sulphone, 1,1,2,2-tetrakis(4'-hydroxyphenyl) ethane or condensation products, manufactured in an acid medium, of formaldehyde with phenols, such as phenolnovolacs or cresol-novolacs; polyglycidyl esters of polycarboxylic acids such as for example phthalic acid diglycidyl ester, tetrahydrophthalic acid diglycidyl ester or hexahydrophthalic acid diglycidyl ester; triglycidyl isocyanurate; N,N'-diglycidyl-5,5-dimethylhydantoin and aminopolyepoxides such as are obtained by dehydrohalogenation of the reaction products from epihalogenohydrin and primary or secondary amines such as aniline or 4,4'-diaminodiphenylmethane; furthermore, alicyclic compounds containing several epoxide groups such as vinylcyclohexene diepoxide, dicyclopentadiene diepoxide, ethylene glycol - bis-(3,4-epoxytetrahydrodicyclopentadien-8-yl) ether, (3',4'-epoxycyclohexylmethyl)-3,4 - epoxycyclohexanecarboxylate, (3',4'-epoxy - 6' - methylcyclohexylmethyl)-3,4-epoxy-6 - methylcyclohexanecarboxylate, bis(cyclopentyl) ether diepoxide or 3-(3',4'-epoxycyclohexyl)-2,4-dioxaspiro-(5,5)-9,10-epoxy-undecane.

A subject of the present invention is therefore also curable mixtures which are suitable for the manufacture of shaped articles including two-dimensional structures and which contain the polyepoxides according to the invention, optionally together with other diepoxide or polyepoxide compounds and furthermore curing agents for epoxide resins such as polyamines or polycarboxylic acid anhydrides.

The polyglycidyl esters according to the invention or their mixtures with other polyepoxide compounds and/or curing agents can furthermore be mixed before curing, at any stage, with usual modifiers such as extenders, fillers and reinforcing agents, pigments, dyestuffs, plasticisers, levelling agents, agents which confer thixotropy, flame-inhibiting substances or mould release agents.

As extenders, reinforcing agents, fillers and pigments which can be employed in the curable mixtures according to the invention there may for example be mentioned: anthracite tar, bitumen, glass fibres, boron fibres, carbon fibres, cellulose, polyethylene powder, polypropylene powder, mica, asbestos, quartz powder, slate powder, aluminium trihydrate, chalk powder, gypsum, antimony trioxide, bentones, silica aerogel ("Aerosil"), lithopone, barytes, titanium dioxide, carbon black, graphite, iron oxide or metal powders such as aluminium powder or iron powder.

Suitable organic solvents for the modification of the curable mixtures are for example toluene, xylene, n-propanol, butyl acetate, acetone, methyl ethyl ketone, diacetone-alcohol, and ethylene glycol monomethyl ether, monoethyl ether and monobutyl ether.

Dibutyl, dioctyl and dinonyl phthalate, tricresyl phosphate, trixylenyl phosphate and polypropylene glycols can for example be employed as plasticisers for the modification of the curable mixtures.

The new polyglycidyl esters can furthermore be partially or completely esterified in a known manner with carboxylic acids, such as in particular higher unsaturated fatty acids, especially for use in the lacquer field. It is furthermore possible to add other curable synthetic resins, for example phenoplastics or aminoplastics, to such lacquer resin formulations.

The curable mixtures can, in the unfilled or filled state, optionally in the form of solutions or emulsions, serve as laminating resins, paints, lacquers, dipping resins, impregnating resins, casting resins, pressing compositions, sintering powders, spreading and filling compositions, floor covering compositions, embedding and insulating compositions for electrotechnology and adhesives, as well as for the manufacture of such products.

In the examples which follow the parts denote parts by weight and the percentages denote percentages by weight.

EXAMPLE 1

Diglycidyl ester of the reaction product of 1 mol of propylene glycol (M~425) and 2 mols of phthalic anhydride (a) Manufacture of the half-ester.—593 g. (4 mols) of phthalic anhydride and 850 g. of polypropylene glycol of average molecular weight 425 are initially introduced into a suitable reaction vessel and warmed to 130° C. whilst stirring. A slightly exothermic reaction starts. After 90 minutes a 130–135° C. the mixture is cooled to 90° C. and a sample is titrated to determine the acid content. The titration indicated 2.78 equivalents/kg. of free carboxyl groups (theoretical value 2.77 equivalents/kg.).

(b) The intermediate product is mixed with 2220 g. (24 mols) of epichlorhydrin in the same reaction vessel and the temperature is kept at 90° C. 20 g. of a 50% strength aqueous solution of tetramethylammonium chloride are introduced, and this initiates an exothermic but easily controllable reaction. The temperature is kept at between 88 and 92° C. The course of the reaction is monitored by means of a pH-electrode. The pH measuring device initially shows a pH of 3.5–4.5 which slowly rises and is about 7 after 20 minutes. After 20 to 25 minutes an abrupt rise in the pH value occurs, indicating the end of the reaction. The pH-electrode is removed and a dropping funnel containing 400 g. (5 mols=125% of the theoretical amount) of aqueous 50% strength sodium hydroxide solution is fitted. The reaction mixture is cooled to 50–60° C. and a further 20 g. of aqueous 50% strength tetramethylammonium chloride solution are added. The apparatus is placed under vacuum. The sodium hydroxide solution is allowed to run in continuously over the course of 80 to 120 minutes at a vacuum of 70–100 mm. Hg and at an internal temperature of 52–58° C., with the water introduced and the water formed being distilled off azeotropically with epichlorhydrin. The epichlorhydrin is separated from the water in a water separator and continuously returned to the reaction mixture. About 300 ml. of water are separated off. In order to work up the reaction mixture, air is admitted into the apparatus and the reaction mixture successively washed in a separating funnel with 1000 ml. of water, with 700 ml. of aqueous 5% strength monosodium phosphate solution and with 700 ml. of water.

The epichlorhydrin solution is concentrated in a rotational evaporator in vacuo (waterpump). The residue is dried for 45 minutes at 120° C. in a vacuum of 1–2 mm. Hg and is then filtered through a pressure filter using filter paper.

1600 g. (96% of theory) of a yellow clear liquid non-crystallising product giving the following analytical values are obtained:

Viscosity (at 25° C.): 3000 cp. (Hoeppler viscometer)
Epoxide content: 2.30 epoxide equivalents/kg. (99.6% of theory)
Chlorine content: 0.6% (according to Wurzschmitt)

The product consists mainly of the diglycidyl ester of formula

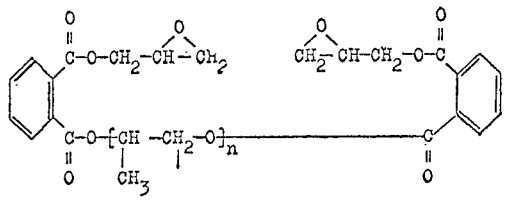

$n \sim 7$ (average value)

EXAMPLE 2

The partial ester was manufactured from phthalic anhydride and polypropylene glycol of average molecular weight 1025 in an analogous manner to that described in Example 1, and the diglycidyl ester was obtained therefrom in the same manner as in Example 1. The following quantities were used: 1025 g. (1 mol) of polypropylene glycol of average molecular weight 1025, 296 g. (2 mols) of phthalic anhydride, 2220 g. (24 mols) of epichlorhydrin, 2×20 g. of tetramethylammonium chloride, 50% strength in water, and 200 g. (2.5 mols) of aqueous sodium hydroxide solution (50% strength). After washing and concentrating the epichlorhydrin solution 1390 g. (97% of theory) of a light-coloured clear liquid non-crystallising product were obtained, giving the following analytical values:

Epoxide content: 1.37 equivalents/kg. (98.2% of theory)
Chlorine content: 0.23% (according to Wurzschmitt)
Viscosity (at 25° C.): 1600 cp. (Hoeppler viscometer).

The product mainly consists of the diglycidyl ester of formula

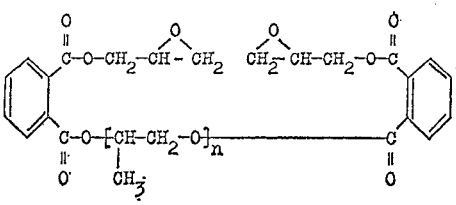

$n =$ about 17.4 (average value)

EXAMPLE 3

The partial ester of phthalic anhydride and polypropylene glycol of average molecular weight 250, manufactured in an analogous manner to that described in Example 1, was glycidylated and worked up in the same manner as in Example 1, with the following quantities being employed: 510 g. (2 mols) of polypropylene glycol of average molecular weight 250 having 7.85 equivalents of hydroxyl groups/kg., 592 g. (4 mols) of phthalic anhydride, 2220 g. (24 mols) of epichlorhydrin, 2× 20 g. of tetramethylammonium chloride, 50% strength in water, and 400 g. (5 mols) of aqueous sodium hydroxide solution (50% strength). 1306 g. (corresponding to 98.5% of theory) of a light-coloured clear liquid non-crystallising product giving the following analytical values were thereby obtained:

Epoxide content: 2.85 equivalents/kg. (94.5% of theory)
Chlorine content: 0.85% (according to Wurzschmitt)
Viscosity (at 25° C.): 3000 cp. (Hoeppler viscometer).

The product mainly consists of the diglycidyl ester of formula

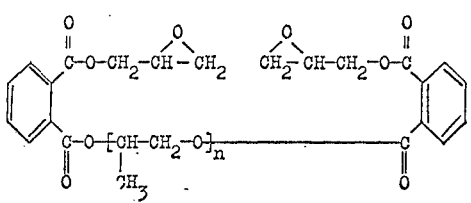

EXAMPLE 4

$n = 4$ (average value)

The diglycidyl ester was manufactured in the same manner as in Example 1 from the partial esters manufactured from phthalic anhydride and polytetramethylene ether glycol ("polybutylene glycol") of average molecular weight 1000 in an analogous manner to that described in Example 1, with the following quantities being employed: 1000 g. (1 mol) of polytetramethylene ether glycol of average molecular weight 1000 (commercial product of Quaker Oats Co. available under the registered name Polymeg 1000), having 2.02 equivalents of hydroxyl groups per kg., 296 g. (2 mols) of phthalic anhydride, 2220 g. (24 mols) of epichlorohydrin, 2× 20 g. of tetramethylammonium chloride, 50% strength in water, and 200 g. (2.5 mols) of aqueous sodium hydroxide solution (50% strength). 1401 g. (corresponding to 99.5% of theory) of a light-coloured clear liquid non-crystallising product giving the following analytical values were thereby obtained:

Epoxide content: 1.37 equivalents/kg. (96.5% of theory)
Chlorine content: 0.45%
Viscosity (at 25° C.): 2000 cp. (Hoeppler viscometer)

The product mainly consists of the diglycidyl ester of the following formula

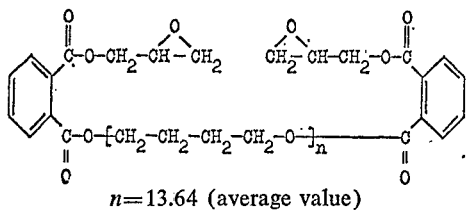

$n = 13.64$ (average value)

EXAMPLE 5

A partial ester was manufactured from 2 mols of phthalic anhydride and 1 mol of polyethylene glycol of average molecular weight 600 in an analogous manner to that described in Example 1, and the diglycidyl ester was obtained therefrom in the same manner as in Example 1, with the following quantities being employed: 600 g. (1 mol) of polyethylene glycol of average molecular weight 600 (commercial product of Union Carbide obtainable under the registered name "Carbowax 600"), the commercial material being dried for 6 hours at 140° C. in a high vacuum before use, 296 g. (2 mols) of phthalic anhydride, 1480 g. (16 mols) of epichlorhydrin, 2× 15 g. of tetramethylammonium chloride, 50% strength in water and 200 g. (2.5 mols) of aqueous sodium hydroxide solution (50% strength). Because of the partial water-solubility of the end product the working-up of the reaction mixture after completion of the addition of the sodium hydroxide solution was carried out in a different manner to that described in Example 1. The reaction mixture was cooled to 20° C. and filtered in order to remove the sodium chloride formed in the reaction. The filtrate was concentrated in a rotational evaporator in a waterjet vacuum. The residue was dried for 45 minutes at 120° C. in a vacuum of 1–2 mm. Hg and filtered through a pressure filter with "Hyflo" and paper. 973 g. (corresponding to 96.5% of theory) of a yellowish brown light-coloured clear non-crystallising liquid product giving the following analytical values were obtained:

Epoxide content: 1.9 equivalents/kg. (96% of theory)
Chlorine content. 0.3% (according to Wurzschmitt)
Viscosity (at 25° C.): 2400 cp. (Hoeppler viscometer).

The product mainly consists of the following compound:

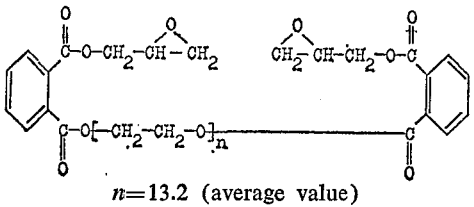

$n = 13.2$ (average value)

EXAMPLE 6

A partial ester was manufactured from 2 mols of phthalic anhydride and 1 mol of polyethylene glycol of average molecular weight 1450 in an analogous manner to that described in Example 1, and the diglycidyl ester was obtained therefrom in the same manner as in Example 1, the following quantities being employed for the purpose: 1450 g. (1 mol) of polyethylene glycol of average molecular weight 1450 (commercial product of Union Carbide obtainable under the registered name "Carbowax 1540")—the commercial product was dried for 4 hours at 140° C. in a high vacuum before use and then had 1.38 equivalents of hydroxyl groups per kg.; 296 g. (2 mols) of phthalic anhydride, 2405 g. (26 mols) of epichlorhydrin, 2× 25 g. of tetramethylammonium chloride, 50% strength in water, and 200 g. (2.5 mols) of aqueous sodium hydroxide solution. As a result of the significant water-solubility of the end product, working-up after completion of addition of the sodium hydroxide solution took place without washing, corresponding to Example 5 and not as in Example 1. 1784 g. (corresponding to 96% of theory) of a light yellow clear product were obtained, which on cooling to room temperature crystallised completely throughout to give a soft white crystal mass giving the following analytical values:

Epoxide content: 1.05 equivalents/kg. (97.5% of theory)
Chlorine content: 0.35% (according to Wurzschmitt)

The product mainly consists of the following compound

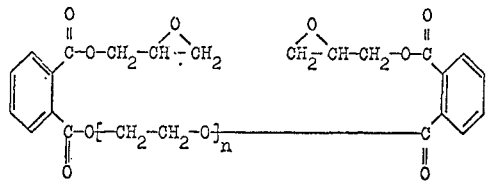

$n = 32.5$ (average value)

EXAMPLE 7

A partial ester was manufactured from 2 mols of phthalic anhydride and 1 mol of polyhexanediol of average molecular weight 1250 in an analogous manner to that described in Example 1 and the diglycidyl ester was obtained therefrom in the same manner as in Example 1, with the following quantities being employed: 1250 g. (1 mol) of polyhexanediol of average molecular weight 1250 and having 1.60 equivalents of hydroxyl groups per kg., manufactured from 1,6-hexanediol in the usual manner, 296 g. (2 mols) of phthalic anhydride, 2220 g. (24 mols) of epichlorhydrin, 200 g. (2½ mols) of aqueous sodium hydroxide solution (50% strength) and 2× 20 g. of tetramethylammonium chloride, 50% strength in water. Working-up took place corresponding to Example 1, and 1625 g. (corresponding to 98% of theory) of a light yellow clear product were thereby obtained, which on cooling to room temperature crystallised and solidified to a white wax-like mass. Analytical values:

Epoxide content: 1.15 equivalents/kg. (95.3% of theory)
Chlorine content: 0.35% (according to Wurzschmitt)
Crystal transition temperatures measured in a differential calorimeter: 40° C.

The product mainly consists of the following compound

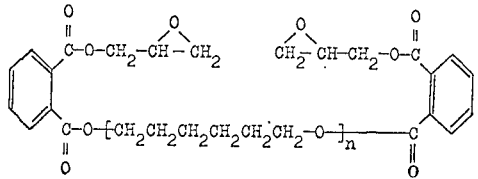

$n = $ about 12 (average value)

EXAMPLE 8

A partial ester was manufactured from 2 mols of benzenetricarboxylic acid-(1,2,4)-anhydride ("trimellitic acid anhydride") and 1 mol of polypropylene glycol of average molecular weight 1025, in an analogous manner to that described in Example 1, and the tetraglycidyl ester was obtained therefrom in the same manner as in Example 1. Herein the following quantities were employed: 1025 g. (1 mol) of polypropylene glycol of average molecular weight 1025, 1.95 equivalents/hydroxyl groups per kg.; 384 g. (2 mols) of trimellitic acid anhydride, 2220 g. (24 mols) of epichlorhydrin, 400 g. (5 mols) of aqueous sodium hydroxide solution (50% strength) and 2× 20 g. of tetramethylammonium chloride, 50% strength in water. Working-up also took place in accordance with Example 1. 1529 g. (corresponding to 93.6% of theory) of a light yellow liquid resin were obtained. Analytical values:

Epoxide content: 2.1 equivalents/kg. (85.7% of theory)
Chlorine content: 0.55% (according to Wurzschmitt)
Viscosity (at 25° C.): 8600 cp. (Hoeppler viscometer).

The product manufactured in this way, and also the products of the following Examples 9 to 11 are very reactive and already begin to change at the temperature of about 120° C. which is necessary for the complete removal of epichlorhydrin, with the epoxide content decreasing and the viscosity increasing. The product mainly consists of a mixture of the following isomeric compounds.

$n=$about 34.6 (average value)

as well as of the corresponding positional isomers, as in Example 8.

EXAMPLE 10

A partial ester was manufactured from 2 mols of trimellitic acid anhydride and 1 mol of polyethylene glycol

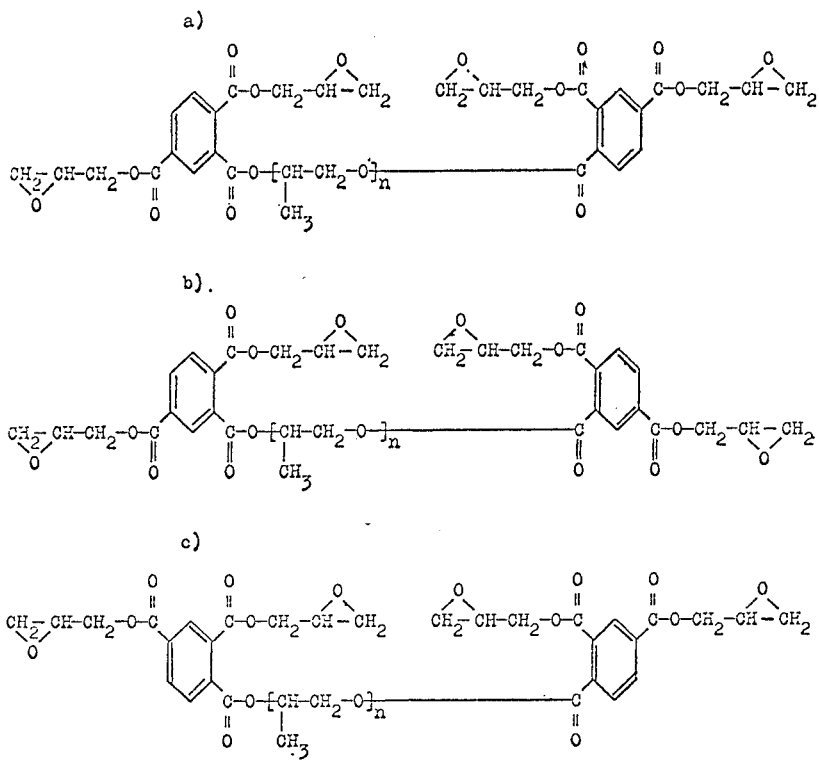

$n=$about 17.4 (average value)

EXAMPLE 9

A partial ester was manufactured from 2 mols of trimellitic acid anhydride and 1 mol of polypropylene glycol of average molecular weight 2025 in an analogous manner to that described in Example 1 and the tetraglycidyl ester was obtained therefrom in the same manner as in Example 1. The following quantities were employed for this purpose: 2025 g. (1 mol) of polypropylene glycol of average molecular weight 2025, 0.985 equivalents of hydroxyl groups/kg.; 384 g. (2 mols) of trimellitic acid anhydride, 3330 g. (36 mols) of epichlorhydrin, 400 g. (5 mols) of aqueous sodium hydroxide solution (50% strength) and 2× 30 g. of tetramethylammonium chloride solution, 50% strength in water. Working-up also took place in accordance with Example 1. 2515 g. (corresponding to 95.5% of theory) of a light yellow clear liquid resin were obtained, given the following analytical values:

Epoxide content: 1.5 equivalents/kg. (98.7% of theory)
Chlorine content: 0.27% (according to Wurzschmitt)
Viscosity (at 25° C.): 4200 cp. (Hoeppler viscometer)

The product mainly consists of the following compound:

of average molecular weight 1450 in an analogous manner to that described in Example 1 and the tetraglycidyl ester was obtained therefrom in the same manner as in Example 1. The following quantities were used for this purpose: 1450 g. (1 mol) of polyethylene glycol of average molecular weight 1450 (commercial product of Union Carbide obtainable under the registered name "Carbowax 1540")—the product was dried for 4 hours at 140° C. under a high vacuum before use and then had 1.38 equivalents of hydroxyl groups/kg.; 384 g. (2 mols) of trimellitic acid anhydride, 2960 g. (32 mols) of epichlorhydrin, 400 g. (5 mols) of aqueous sodium hydroxide solution (50% strength) and 2 × 25 g. of tetramethylammonium chloride solution, 50% strength in water. Working-up after completion of the addition of the sodium hydroxide solution took place as in Example 5 by filtering and washing with water. 1966 g. (corresponding to 96.5% of theory) of a light yellow clear liquid product were obtained, which after cooling at room temperature partially solidified to give a soft crystal mass giving the following analytical values:

Epoxide content: 1.8 equivalents/kg. (92.6% of theory)
Chlorine content: 0.5% (according to Wurzschmitt)

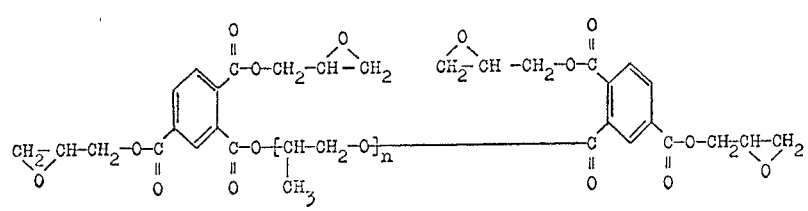

The product mainly consists of the following compound:

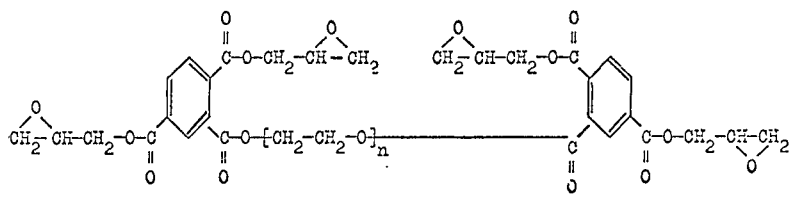

n=about 32.5 (average value)

as well as of the corresponding positional isomers as in Example 8.

EXAMPLE 11

A partial ester was manufactured from 2 mols of trimellitic acid anhydride and 1 mol of polybutylene glycol of average molecular weight 1000 in an analogous manner to that described in Example 1 and the diglycidyl ester obtained therefrom in the same manner as in Example 1. The following quantities were employed: 1000 g. (1 mol) of polytetramethylene ether glycol of average molecular weight 1000 (commercial product of Quaker Oats obtainable under the registered name "Polymeg 1000") having 2.02 equivalents of hydroxyl groups per kg., 384 g. (2 mols) of trimellitic acid anhydride, 2590 g. (28 mols) of epichlorhydrin, 400 g. (5 mols) of aqueous sodium hydroxide solution (50% strength) and 2×22 g. of tetramethylammonium chloride solution, 50% strength in water. Working-up took place in accordance with Example 1. 1549 g. (corresponding to 96.3% of theory) of a light-coloured clear non-crystallising product giving the following analytical values were obtained:

Epoxide content: 2.2 equivalents/kg. (88.5% of theory)
Chlorine content: 0.77% (according to Wurzshcmitt)
Viscosity (at 25° C.): 6500 cp. (Hoeppler viscometer)

The product mainly consists of the following compound:

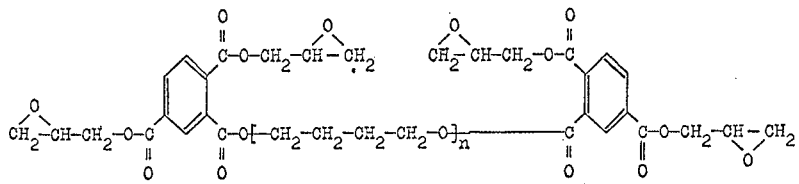

n=about 13.64 (average value)

as well as of the corresponding positional isomers as in Example 8.

EXAMPLE 12

The partial ester was manufactured from tetrachlorophthalic anhydride and polypropylene glycol of average molecular weight 425 in an analogous manner to that described in Example 1 and the diglycidyl ester was obtained therefrom in the same manner as in Example 1. The following quantities were employed: 425 g. (1 mol) of polypropylene glycol of average molecular weight 425, having 4.7 equivalents of hydroxyl groups per kg.; 572 g. (2 mols) of tetrachlorophthalic anhydride, 1480 g. (16 mols) of epichlorhydrin, 200 g. (2½ mols) of aqueous sodium hydroxide solution (50% strength) and 2×15 g. of tetramethylammonium chloride solution, 50% strength in water. The epichlorhydrin solution was washed and concentrated as in Example 1. 1015 g. (corresponding to 91.5% of theory) of a light-coloured yellowish brown liquid resin giving the following analytical values were obtained:

Epoxide content: 1.6 equivalents/kg. (89% of theory)
Chlorine content: 25.4% (99.3% of theory)
Viscosity (at 25° C.): 14200 cp. (Hoeppler viscometer).

The product mainly consists of the diglycidyl ester of formula

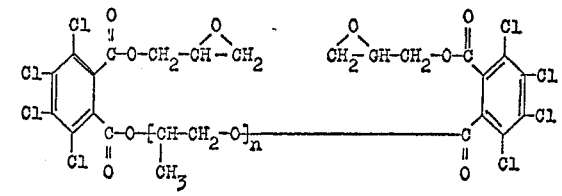

n=about 7 (average value)

EXAMPLE 13

A partial ester was manufactured from tetrachlorophthalic anhydride and polybutylene glycol of average molecular weight 1000 in an analogous manner to that described in Example 1 and the diglycidyl ester was obtained therefrom in the same manner as in Example 1. The following quantities were employed: 1000 g. (1 mol) of polybutylene glycol of average molecular weight 1000 (product of Quaker Oats commercially available under the registered name "Polymeg 1000") having 2.02 equivalents of hydroxyl groups per kg.; 572 g. (2 mols) of tetrachlorophthalic anhydride, 2220 g. (24 mols) of epichlorhydrin, 200 g. (2½ mols) of aqueous sodium hydroxide solution (50% strength), and 2×25 g. of tetramethylammonium chloride solution, 50% strength in water. The epichlorhydrin solution was washed and concentrated as in Example 1. 1527 g. (corresponding to 90.7% of theory) of a light yellow liquid resin giving the following analytical values were obtained:

Epoxide content: 1.1 equivalents/kg. (92.6% of theory)
Viscosity (at 25° C.): 5100 cp. (Hoeppler viscometer)
Chlorine content: 16.8% (99.8% of theory)

The product mainly consists of the following compound:

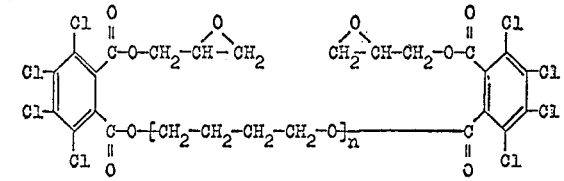

n=about 13.64 (average value)

EXAMPLE 14

A partial ester was manufactured from tetrachlorophthalic anhydride and polyethylene glycol having an average molecular weight of 800 in an analogous manner to that described in Example 1 and the diglycidyl ester was obtained therefrom in the same manner as in Example 1. The following quantities were employed: 800 g. (1 mol) of polyethylene glycol of average molecular weight 800, 2.5 equivalents of hydroxyl groups/kg., dried for 4 hours at 140° C. in a high vacuum; 572 g. (2 mols) of tetrachlorophthalic anhydride, 2220 g. (24 mols) of epichlorhydrin, 200 g. (2½ mols) of aqueous sodium hydroxide solution (50% strength) and 2×25 g. of tetramethylammonium chloride solution, 50% strength in water. Working-up after completion of the addition of the sodium hydroxide solution took place as in Example 5, by filtering and without washing with water. 1355 g. (91.3% of theory) of a light yellow clear liquid resin giving the following analytical values were obtained:

Epoxide content: 1.35 equivalents/kg. (100% of theory)
Viscosity (at 25° C.): 4200 cp. (Hoeppler viscometer)
Chlorine content: 19.8% (103.6% of theory)

with epichlorhydrin in the presence of alkali, and with phthalic anhydride in the quantity ratios specified in the table below, whilst warming, to give a homogeneous melt and were cast into siliconised 4 mm. tensile rod moulds according to DIN 53.455. The samples were cured for 24 hours at 160° C. The tensile strength according to DIN and the elongation at break of the cured casting resin samples were determined. To provide a simpler comparison, the product of ½ ×elongation at break×tensile strength was calculated as a measure of the toughness of the product.

| Glycidyl ester according to Example | Parts by weight of glycidyl ester | Parts by weight of A epoxide resin | Parts by weight of phthalic anhydride | Tensile strength, kg./mm.$^2$ (DIN) | Elongation at break (percent) | Product of ½× elongation at break ×tensile strength |
|---|---|---|---|---|---|---|
|  | 0 | 76 | 24 | 7.6 | 4 | 15.2 |
| 1 | 17 | 60 | 23 | 7.8 | 6 | 23.5 |
| 1 | 22 | 55 | 23 | 8.3 | 6.4 | 26.5 |
| 1 | 29 | 48 | 23 | 8.15 | 9.6 | 39 |
| 2 | 14 | 63 | 23 | 8.0 | 5 | 20 |
| 2 | 23 | 56 | 21 | 6.2 | 7.2 | 22.4 |
| 8 | 22 | 54.5 | 23.5 | 6.5 | 6 | 19.5 |

| Glycidyl ester according to Example | Parts by weight of glycidyl ester | Parts by weight of Bisphenol-A resin | Parts by weight of phthalic anhydride | Parts by weight of quartz powder | Tensile strength, kg./mm.$^2$ (DIN) | Elongation at break (percent) | Product of ½× elongation at break × teasile strength |
|---|---|---|---|---|---|---|---|
| 1 | 100 |  | 3.3 | 250 | 0.9 | 14 | 6.3 |
| 1 | 100 |  | 3.3 | 200 | 0.9 | 25 | 11.3 |
| 1 | 100 |  | 3.3 |  | 1.1 | 34 | 18.7 |

The product mainly consists of the following compound:

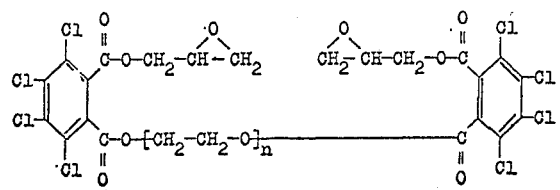

n=about 17.8 (average value)

EXAMPLE 15

Several of the polyglycidyl esters manufactured according to Examples 1–14 were mixed with varying quantities of a bisphenol-A epoxide resin which is solid at room temperature and has 2.5 epoxide equivalents/kg., manufactured in a known manner by reaction of bisphenol-A

EXAMPLE 16

Several of the polyglycidyl esters manufactured according to Examples 1–14, by themselves or together with a bisphenol-A epoxide resin which is liquid at room temperature and has 5.3 epoxide equivalents/kg., were mixed homogeneously, without warming, with triethylene tetramine in the quantity ratios specified in the table below and cast into siliconised 4 mm. tensile rod moulds according to DIN 53.455. After 2 days at room temperature the tensile strength according to DIN and the elongation at break were determined.

| Glycidyl ester according to Example | Parts by weight of glycidyl ester | Parts by weight of Bisphenol-A epoxide resin (liquid) | Parts by weight of triethylene tetramine | Tensile strength, kg./mm.$^2$ (DIN) | Elongation at break (percent) | Products of ½×elongation at break × tensile strength |
|---|---|---|---|---|---|---|
|  | 0 | 91 | 9 | 4.8 | 2.7 | 6.5 |
| 2 | 19 | 73 | 8 | 5.7 | 4.0 | 11.4 |
| 2 | 31 | 62 | 7 | 3.6 | 6 | 11 |
| 3 | 85 | 8.5 | 6.5 | 0.5 | 110 | 27.5 |
| 3 | 78 | 15.5 | 6.5 | 2.5 | 15 | 18.7 |
| 1 | 83 | 10 | 7 | 0.4 | 128 | 25.6 |

EXAMPLE 17

Epoxide resin B: For comparison purposes, the partial ester from 2 mols of phthalic acid anhydride and 1 mol of ethylene glycol was manufactured in an analogous manner to that described in Example 1 and the diglycidyl ester (epoxide resin B) was obtained therefrom in the same manner as in Example 1. The yield was 86% of theory and the product showed the following analytical values:

Epoxide content: 3.9 equivalents/kg. (92% of theory)
Chlorine content: 1.8% (according to Wurzschmitt)
Viscosity (at 25° C.):96,000 cp. (Hoeppler viscometer).

Epoxide resin C: The partial ester from 2 mols of phthalic anhydride and 1 mol of 1,6-hexanediol was manufactured in an analogous manner to that described in Example 1 and the diglycidyl ester was obtained therefrom in the same manner as in Example 1. The yield was 89% of theory and the product showed the following analytical values:

Epoxide content: 3.5 equivalents/kg. (95% of theory)
Chlorine content: 0.9% (according to Wurzschmitt)
Viscosity (at 25° C.): 72,000 cp. (Hoeppler viscometer).

The epoxide resins B and C manufactured according to Example 17 were cast and cured in accordance with Example 15. The tensile strength according to DIN and the elongation at break of the cured casting resin samples were determined.

| Glycidyl ester according to Example 17 | Parts by weight of glycidyl ester | Parts by weight of Bisphenol A epoxide resin | Parts by weight of phthalic anhydride | Tensile strength, kg./mm.² (DIN) | Elongation at break (percent) | Product of ½× elongation at break × tensile strength |
|---|---|---|---|---|---|---|
| B | 100 |    | 58 | 5.5 | 4   | 11 |
|   | 50  | 50 | 45 | 6.5 | 3.5 | 11 |
| C | 100 |    | 52 | 5.0 | 5   | 12.5 |
|   | 50  | 50 | 41 | 6.0 | 4   | 12 |

We claim:
1. Diglycidyl ester of formula

($n=4-35$)

2. Diglycidyl ester of formula ($n=7$)

3. Diglycidyl ester of formula ($n=13-33$)

4. Diglycidyl ester of formula $n=6-20$

5. Diglycidyl ester of formula ($n=14$)

6. Diglycidyl ester of formula ($n=7$)

7. Tetraglycidyl ester of formula ($n=4-35$)

wherein each Z denotes a carbo-glycidyloxy group which is in the meta-position or para-position to the second carboglycidyloxy group bonded to the same benzene ring.

References Cited

UNITED STATES PATENTS 2,895,947  7/1959  Shokal et al. _____ 260—78.4
2,865,897  12/1958 Raecke et al. _____ 260—78.4

FOREIGN PATENTS 559,078  6/1958  Canada _____ 260—348

NORMA S. MILESTONE, Primary Examiner

U.S. Cl. X.R.

260—475 P, 2 EC, 2 EA, 2 N